[12] United States Patent
Fukazawa et al.

(10) Patent No.: US 9,836,675 B2
(45) Date of Patent: Dec. 5, 2017

(54) PRINTING CONTROL APPARATUS AND METHOD FOR PERFORMING COLOR DENSITY CORRECTION IN OVERLAPPING AREA OF IMAGE DATA

(71) Applicant: SEIKO EPSON CORPORATION, Tokyo (JP)

(72) Inventors: Masahiro Fukazawa, Chino (JP); Naoki Sudo, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 14/638,969

(22) Filed: Mar. 4, 2015

(65) Prior Publication Data

US 2015/0254538 A1 Sep. 10, 2015

(30) Foreign Application Priority Data

Mar. 5, 2014 (JP) ................................ 2014-042456

(51) Int. Cl.
*G06K 15/02* (2006.01)
*G06K 15/10* (2006.01)

(52) U.S. Cl.
CPC ....... *G06K 15/1878* (2013.01); *G06K 15/105* (2013.01); *G06K 15/1868* (2013.01)

(58) Field of Classification Search
None
See application file for complete search history.

(56) References Cited

U.S. PATENT DOCUMENTS

| 5,600,353 | A | * | 2/1997 | Hickman | G06K 15/105 347/40 |
| 6,031,627 | A | * | 2/2000 | Kakutani | H04N 1/40087 358/1.9 |
| 6,384,930 | B1 | * | 5/2002 | Ando | G06F 3/1297 358/1.17 |
| 7,099,024 | B2 | * | 8/2006 | Yagi | B41J 2/2135 347/19 |
| 8,033,630 | B2 | * | 10/2011 | Miyamoto | B41J 2/2139 347/12 |
| 8,149,456 | B2 | * | 4/2012 | Fan | H04N 1/6019 345/549 |
| 2010/0026745 | A1 | * | 2/2010 | Kayahara | B41J 2/0458 347/10 |
| 2010/0118318 | A1 | | 5/2010 | Fuse et al. | |

(Continued)

FOREIGN PATENT DOCUMENTS

| JP | 2004-122546 A | 4/2004 |
| JP | 2007-185904 A | 7/2007 |

(Continued)

*Primary Examiner* — Barbara Reiner
(74) *Attorney, Agent, or Firm* — Maschoff Brennan

(57) ABSTRACT

A printing control apparatus, which controls printing of a printing area including an overlapping area on which printing is performed through a plurality of scanning operations, includes a printing data generation section that generates sets of printing data each associated with a corresponding one of the plurality of scanning operations in the overlapping area on the basis of an image data targeted for printing. The printing data generation section performs correction in accordance with a color density of the overlapping area in the image data.

13 Claims, 10 Drawing Sheets

(56) References Cited

U.S. PATENT DOCUMENTS

| | | | |
|---|---|---|---|
| 2010/0271413 A1* | 10/2010 | Kado | B41J 2/04508 347/14 |
| 2011/0085000 A1* | 4/2011 | Sudo | B41J 2/15 347/14 |
| 2011/0273729 A1* | 11/2011 | Tanase | B41J 2/155 358/1.8 |
| 2012/0188562 A1 | 7/2012 | Marumoto et al. | |

FOREIGN PATENT DOCUMENTS

| | | |
|---|---|---|
| JP | 2007-245656 A | 9/2007 |
| JP | 2010-137553 A | 6/2010 |
| JP | 2012-152977 A | 8/2012 |

* cited by examiner

FIG. 7

NOZZLE RATIO TABLE

| OVERLAPPING NOZZLE NUMBER | 1 | 2 | 3 | 4 |
|---|---|---|---|---|
| UPPER-NOZZLE RATIO (%) | 20 | 40 | 60 | 80 |
| LOWER-NOZZLE RATIO (%) | 80 | 60 | 40 | 20 |

FIG. 8

OVERSTRIKING RATIO TABLE

| COLOR DENSITY (%) | 0 | 11 | 22 | 33 | 44 | 55 | 66 | 77 | 88 | 100 |
|---|---|---|---|---|---|---|---|---|---|---|
| OVERSTRIKING RATIO (%) | 0 | 2 | 4 | 7 | 11 | 15 | 18 | 22 | 26 | 30 | ent
PRINTING CONTROL APPARATUS AND METHOD FOR PERFORMING COLOR DENSITY CORRECTION IN OVERLAPPING AREA OF IMAGE DATA

CROSS-REFERENCE TO RELATED APPLICATIONS

This application claims priority to Japanese Patent Application No. 2014-042456 filed on Mar. 5, 2014. The entire disclosure of Japanese Patent Application No. 2014-042456 is hereby incorporated herein by reference.

BACKGROUND

1. Technical Field

The present invention relates to a printing control apparatus and a printing control method.

2. Related Art

When band printing is performed by using a serial printer, banding (such as a streak pattern due to contrasting density of an ink) sometimes occurs in a joint portion between adjacent band portions because of error in transportation of a printing medium, or the like. With respect to such a problem, partially overlapping (POL) printing is well known. In this POL printing, subsequent to printing on a single band portion through a single scanning operation performed by a printing head, printing paper is transported in a sub-scanning direction by a distance smaller than the length of a sub-scanning-direction width of the single band portion, and printing on a next single band portion is performed through a next single scanning operation performed by the printing head. The occurrences of such banding are reduced by providing a POL area on which printing is performed through two scanning operations.

In such a POL area, a white streak occurs when landing positions of an ink are misaligned (this "landing" means adherence of an ink droplet discharged through a nozzle onto a printing medium). Reasons for such misalignments of the landing positions are airflow caused by an operation of a printing head, error in transportation of a printing medium, nozzle characteristics, alignment error, and the like. Particularly, in an area where color density is high (for example, an area where a landing amount of a black ink is large), the white streak is likely to be highly visible.

Here, in order to reduce the occurrences of such a white streak, a method of increasing an amount of an ink to be landed on the POL area is conceived. In this case, however, a black streak becomes likely to occur. Particularly, in an area where color density is low (for example, an area where a landing amount of a black ink is small), the black streak is likely to be highly visible.

In addition, the white streak is not limited to a streak in a white color, but its meaning also includes a streak in a color lighter than surrounding colors. Further, the black streak is not limited to a streak in a black color, but its meaning also includes a streak in a color darker than surrounding colors.

In addition, a related technology is described in JP-A-2007-245656.

SUMMARY

An advantage of some aspects of the invention is that a printing quality is improved by reducing the occurrences of both of a white streak and a black streak in a POL area.

According to a first aspect of the invention, a printing control apparatus, which controls printing of a printing area including an overlapping area on which printing is performed through a plurality of scanning operations, includes a printing data generation section that generates sets of printing data each associated with a corresponding one of the plurality of scanning operations in the overlapping area on the basis of an image data targeted for printing. Further, the printing data generation section performs correction in accordance with a color density of the overlapping area in the image data. In this way, particularly, in a serial printer, an amount of an ink to be discharged onto the overlapping area is corrected in accordance with a color density of the overlapping area, and thus, the reduction of the occurrences of both of the white streak and the black streak in the overlapping area can be achieved, thereby enabling improvement of a printing quality.

In the above printing control apparatus, it is preferable that the printing data generation section perform correction in which an amount of an ink to be discharged is increased when a color density of the overlapping area in the image data is increased. In this way, an amount of an ink discharged onto the overlapping area is increased when a color density of the overlapping area is increased, and thus, the occurrences of the black streak become more likely to be reduced in an area where a color density is low, and the occurrences of the white streak become more likely to be reduced in an area where a color density is high.

In the above printing control apparatus, it is preferable that the printing data generation section perform correction in which an amount of an ink that is to be ejected in a scanning operation that has used smaller amount of ink than the other scanning operations, is preferentially increased. In this way, it is possible to decrease a difference among the plurality of scanning operations in amount of an ink to be discharged.

In the above printing control apparatus, it is preferable that the printing data generation section calculate an average color density of the overlapping area in the image data for each predetermined pixel unit and perform correction in accordance with the calculated average color density for each predetermined pixel unit. It is possible to reduce a variation in increase of an ink by using the average color density.

In the above printing control apparatus, it is preferable that the printing data generation section increase the number of pixels in the predetermined pixel unit when a resolution of the image data is increased. In this way, it is possible to reduce the number of calculations of the average color density.

In the above printing control apparatus, it is preferable that the printing data generation section perform correction in accordance with a color density of an area surrounding the overlapping area in the image data. In this way, it is also possible to calculate a color density of an edge portion of the overlapping area with accuracy.

According to a second aspect of the invention, a printing control method for controlling printing of a printing area including an overlapping area on which printing is performed through a plurality of scanning operations includes, performing a correction process in accordance with a color density of the overlapping area in the image data when generating sets of printing data each associated with a corresponding one of the plurality of scanning operations in the overlapping area on the basis of an image data targeted for printing. In this way, particularly, in a serial printer, an amount of an ink to be discharged is corrected in accordance with a color density of the overlapping area, and thus, the occurrences of both of the white streak and the black streak in the overlapping area can be reduced so as to improve a printing quality.

According to a third aspect of the invention, a program casing a printing control apparatus to control printing of a printing area including an overlapping area on which printing is performed through a plurality of scanning operations is configured to cause the printing control apparatus to function as a printing data generation section that generates sets of printing data each associated with a corresponding one of the plurality of scanning operations in the overlapping area on the basis of an image data targeted for printing. Further, the printing data generation section performs correction in accordance with a color density of the overlapping area in the image data. In this way, particularly, in a serial printer, an amount of an ink to be discharged is corrected in accordance with a color density of the overlapping area, and thus, the occurrences of both of the white streak and the black streak in the overlapping area can be reduced so as to improve a printing quality.

According to a fourth aspect of the invention, a printing control apparatus that controls printing of a printing area which is to be printed on a line-by-line basis and has an overlapping area on which printing is performed using a plurality of nozzles includes a printing data generation section that generates sets of printing data each associated with a corresponding one of the plurality of nozzles for the overlapping area on the basis of an image data targeted for printing. Further, the printing data generation section performs correction in accordance with a color density of the overlapping area in the image data. In this way, in a line printer, an amount of an ink to be discharged is corrected in accordance with a color density of the overlapping area, and thus, the occurrences of both of the white streak and the black streak in the overlapping area can be reduced so as to improve a printing quality.

BRIEF DESCRIPTION OF THE DRAWINGS

The invention will be described with reference to the accompanying drawings, wherein like numbers reference like elements.

FIG. 7 is a diagram illustrating an example of a nozzle ratio table according to the first embodiment of the invention.

FIG. 8 is a diagram illustrating an example of an overstriking ratio table according to the first embodiment of the invention.

DESCRIPTION OF EXEMPLARY EMBODIMENTS

First Embodiment

Hereinafter, a first embodiment according to the invention will be described with reference to some of the drawings.

Figure 1:
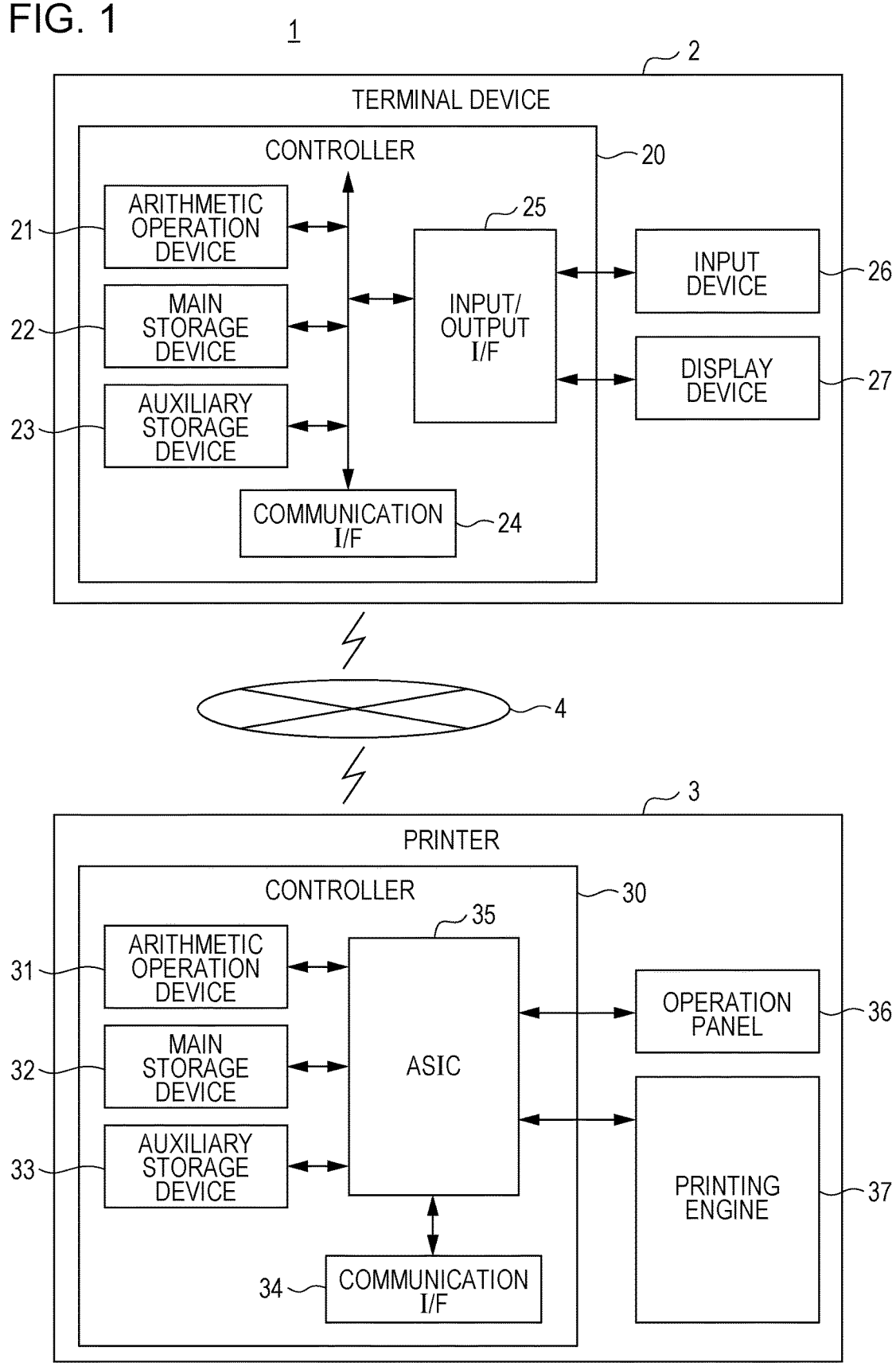
FIG. 1 is a diagram illustrating an example of a hardware configuration of a printing system according to a first embodiment of the invention.

FIG. 1 is a diagram illustrating an example of a hardware configuration of a printing system according to a first embodiment of the invention.

The printing system 1 includes a terminal device 2 (also referred to as a "printing control apparatus") and a printer 3 (also referred to as a "printing apparatus"). The terminal device 2 and the printer 3 are capable of communicating with each other via a network. A network 4 is a communication network, such as a local area network (LAN).

The terminal device 2 is a device, such as a personal computer (PC), a tablet computer, or a smartphone. The terminal device 2 generates a set of printing data interpretable by the printer 3 on the basis of a set of printing target data, such as a file of data designated by a user, and transmits the generated set of printing data to the printer 3 to cause the printer 3 to perform printing based on the set of printing data.

The set of printing data, which is generated by the terminal device 2 on the basis of the set of printing target data, is a set of printing data necessary for the printer 3 to perform POL printing.

Upon reception of a set of printing data having been transmitted from, for example, the terminal device 2, the printer 3 performs printing on a printing medium, such as printing paper, by using one or more color inks, on the basis of the received set of printing data.

The printer 3 is a serial printer which causes a printing head to perform printing on a band-by-band basis, and has a function of POL printing.

The terminal device 2 includes a controller 20, an input device 26, and a display device 27.

The controller 20 is a unit for controlling the entire terminal device 2. The controller 20 includes an arithmetic operation device 21, such as a central processing unit (CPU); a main storage device 22, such as a dynamic random access memory (DRAM) device; an auxiliary storage device 23, such as a hard disk drive (HDD); a communication interface (I/F) 24 communicably connected to the network 4; an input/output I/F 25 communicably connected to the input device 26 and the display device 27; and the like.

The input device 26 is an input device, such as a keyboard, a mouse device, a touch panel and/or a touch sensor. The display device 27 is a display, such as a liquid crystal display or an organic electro-luminescence (EL) display.

The printer 3 includes a controller 30, an operation panel 36, and a printing engine 37.

The controller 30 is a unit for controlling the entire printer 3. The controller 30 performs processes, such as a process of receiving a set of printing data from the terminal device 2; a process of causing the printing engine 37 to execute printing on the basis of the set of printing data; a display process in the operation panel 36; and a process of detecting an operation of a user.

The controller 30 includes an arithmetic operation device 31, such as a CPU; a main storage device 32, such as a DRAM device; an auxiliary storage device 33, such as a HDD; a communication I/F 34 communicably connected to the network 4; an application specific integrated circuit (ASIC) 35; and the like.

The ASIC 35 includes a control circuit for controlling the printing engine 37; an image processing circuit for performing various image processes; an interface circuit for controlling data exchange with each of the arithmetic operation device 31, the main storage device 32, the auxiliary storage device 33, and the communication I/F 34. The ASIC 35 performs processes under the control of the arithmetic operation device 31, such as a process of transmitting control signals to the printing engine 37 to drive it on the basis of printing data; a process of transmitting display data stored in the main storage device 32 to the operation panel 36; and a process of transferring data received from the operation panel 36 to the arithmetic operation device 31 and the main storage device 32.

The operation panel 36 is a unit functioning as an input/output interface between the printer 3 and a user. The operation panel 36 includes a display, such as a liquid crystal display or an organic EL display, and a hard switch functioning as an input device, such as a touch panel, a touch sensor, or button keys. The operation panel 36 displays, for example, an operation menu under the control of the controller 30. Further, for example, the operation panel 36 identifies a touched position corresponding to an X-Y coordinate location of a displayed image; convers the touched position into X-Y coordinate values; and transmits the X-Y coordinate values to the controller 30.

The printing engine 37 includes, for example, at least one ink cartridge; a printing head for discharging an ink fed from each of the at least one cartridge; a carriage for mounting the printing head; a carriage driving mechanism for moving the carriage in a main-scanning direction; a transportation mechanism for transporting a printing medium in a sub-scanning direction; and a paper feeding/ejecting mechanism for feeding/ejecting the printing medium (any one of these components being not illustrated). The printing head includes a plurality of nozzles, through each of which ink droplets are discharged. The printing engine 37 forms dots on the printing medium by performing processes under the control of the controller 30, such as a process of moving the carriage in the main-scanning direction, a process of transporting the printing medium in the sub-scanning direction, a process of discharging ink droplets through the nozzles of the printing head. The printing engine 37 is capable of performing POL printing.

Figure 2:
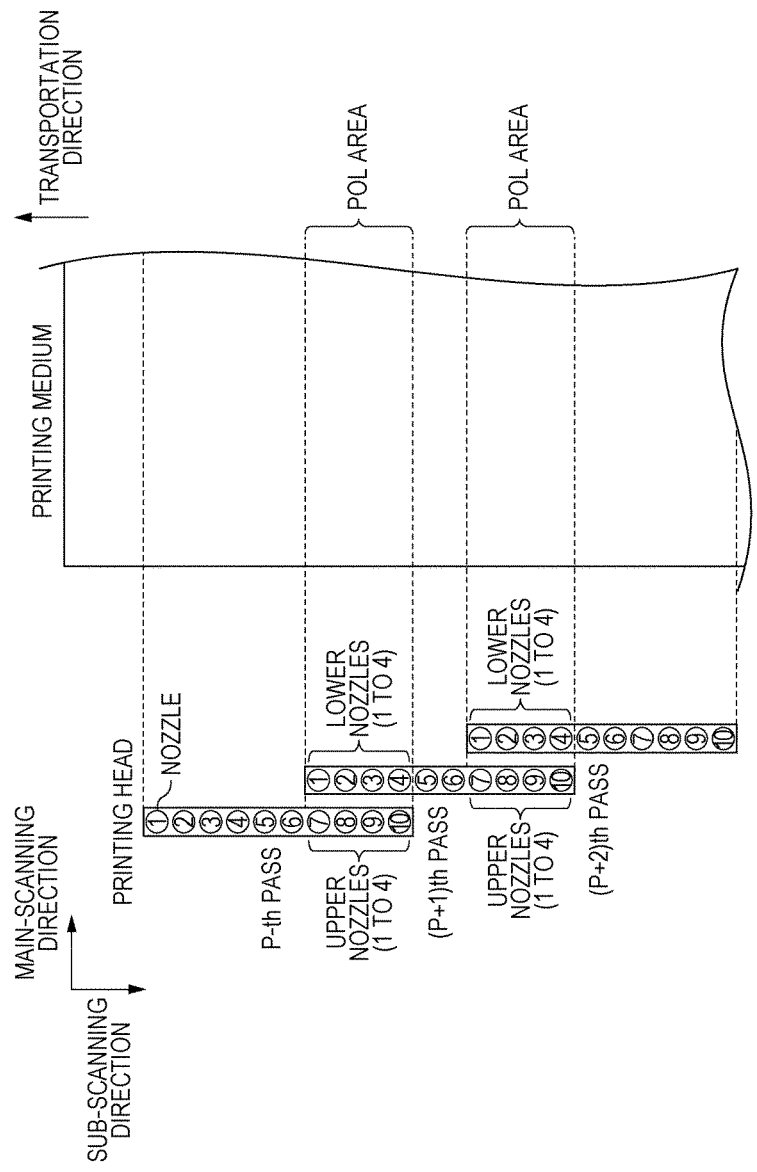
FIG. 2 is a diagram that describes an example of POL printing according to the first embodiment of the invention.

FIG. 2 is a diagram that describes an example of POL printing. In the POL printing, within a printing area (for example, one page of a printing area), there exist POL areas, on each of which band areas each printed through a corresponding one of scanning operations of the printing head are partially overlapped with each other (the scanning operation of the printing head being called a "pass"). In the example shown in FIG. 2, the printing head is provided thereon with ten nozzles which are arranged in the sub-scanning line (these ten nozzles being sequentially denoted by nozzle numbers 1 to 10 from an upper portion of FIG. 2). Further, two sets of four nozzles are overlapped with each other between two successive passes. More specifically, in the POL area, in a P-th pass, a printing operation is performed through nozzles of nozzle numbers 7 to 10, and in a next (P+1)th pass, another printing operation is performed through nozzles of nozzle numbers 1 to 4. The width of the POL area in the sub-scanning direction can be made, for example, a width larger than a pre-measured mechanical error width of paper feeding.

Hereinafter, description will be made on the basis of the specific example shown in FIG. 2. Here, the nozzles of nozzle numbers 7 to 10 in the P-th pass are handled as upper nozzles (which are, from an upper portion of FIG. 2, sequentially denoted by overlapping nozzle numbers 1 to 4). Further, the nozzles of nozzle numbers 1 to 4 in the (P+1)th pass are handled as lower nozzles (which are, from an upper portion of FIG. 2, sequentially denoted by overlapping nozzle numbers 1 to 4).

The above configurations of the terminal device 2 and the printer 3 are just configurations of main portions which have been exemplified in order to describe the features of the invention, and the invention is not limited to the above configurations. The above configurations of the device 2 and the printer 3 do not exclude any other configurations provided in commonly used terminal devices and printers. Further, the above configurations of the printing system 1 are just configurations of main portions which have been exemplified in order to describe the features of the invention, and the invention is not limited to the above configurations. The above configurations of the printing system 1 do not exclude any other configurations provided in commonly used printing systems.

Figure 3:
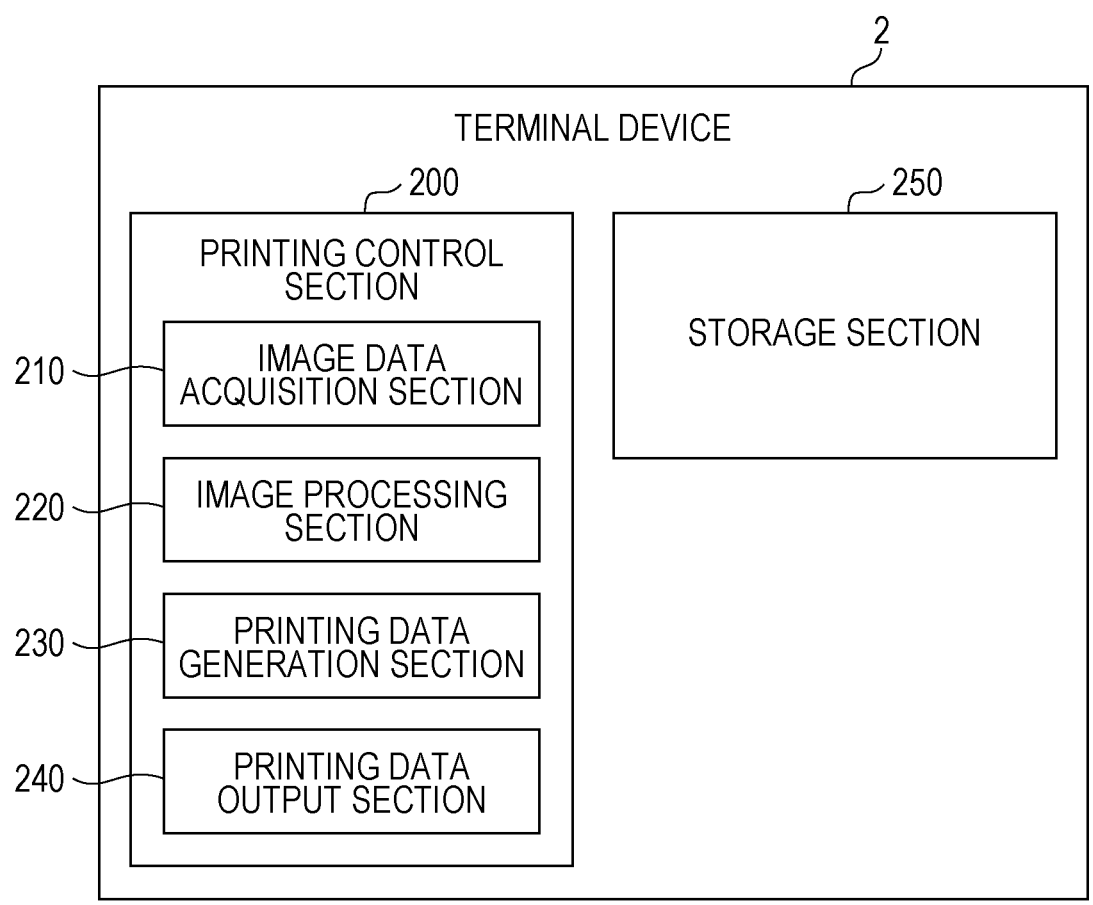
FIG. 3 is a diagram illustrating an example of a configuration of functions of a terminal device according to the first embodiment of the invention.

FIG. 3 is a diagram illustrating a configuration of functions of the terminal device 2 according to this embodiment. As shown FIG. 3, the terminal device 2 includes a printing control section 200 and a storage section 250.

The printing control section 200 acquires a set of printing target data; generates a set of printing data required for POL printing on the basis of the set of printing target data; and transmits the generated set of printing data to the printer 3. In order to perform these processes, the printing control section 200 includes an image data acquisition section 210, an image processing section 220, a printing data generation section 230, and a printing data output section 240.

The image data acquisition section 210 acquires a set of printing target data from the storage section 250. The set of printing target data is a set of RGB image data which includes, for each pixel, grayscale values each associated with a corresponding one of red (R), green (G), and blue (B) colors.

The image processing section 220 performs various image processes, such as a resolution conversion process, a color conversion process, and a halftone process. The halftone process is performed, for each color, on a set of image data resulting from the color conversion process. As a method for the halftone process, for example, a dither method is employed. This dither method is a method in which, for each pixel, a corresponding grayscale value contained in a set of image data is compared with a corresponding threshold value which is set in a dither mask (also called a "dither matrix)", and thereby, it is determined, for each pixel, whether or not a corresponding dot is to be formed.

The printing data generation section 230 generates, for the POL area, a subset of printing data for the upper nozzles as well as a subset of printing data for the lower nozzles by correcting (may be called "adjusting") a set of printing data resulting from the halftone process.

Processing performed by the printing data generation section 230 will be described below in detail.

The printing data output section 240 generates blocks of printing data each associated with a corresponding one of scanning operations on the basis of a set of printing data having been generated by the printing data generation section 230. That is, the printing data output section 240 performs a rasterization process such that pieces of printing data are arranged in order of actual passes of the printing head.

The storage section 250 stores therein sets of printing data before and after each of various processes, tables for use in settings of sets of printing data, and the like.

The aforementioned printing control section 200 is realized by, for example, causing the arithmetic operation device 21 to execute a predetermined program (for example, a printer driver) having been loaded into the main storage device 22 from the auxiliary storage device 23. The storage section 250 is realized by the main storage device 22 or the auxiliary storage device 23, or the storage section 250 is realized by causing the arithmetic operation section 21 to use the main storage device 22 or the auxiliary storage device 23.

The aforementioned function configuration of the terminal devices 2 is just a configuration resulting from categorization which is performed in accordance with main process contents in order to make it easy to understand the configuration of the terminal device 2. The invention is not limited by any method of categorization into constituent components as well as any name of a resultant constituent component. The configuration of the terminal device 2 can be categorized into a larger number of constituent components in accordance with process contents. Further, the configuration of the terminal device 2 can be categorized such that any one of resultant constituent components performs a larger number of processes. Further, processes allocated to each of the constituent components may be executed by one hardware component or may be executed by a plurality of hardware components. Further, the processes allocated to each of the constituent components may be executed by one program or may be executed by a plurality of programs.

Figure 4:
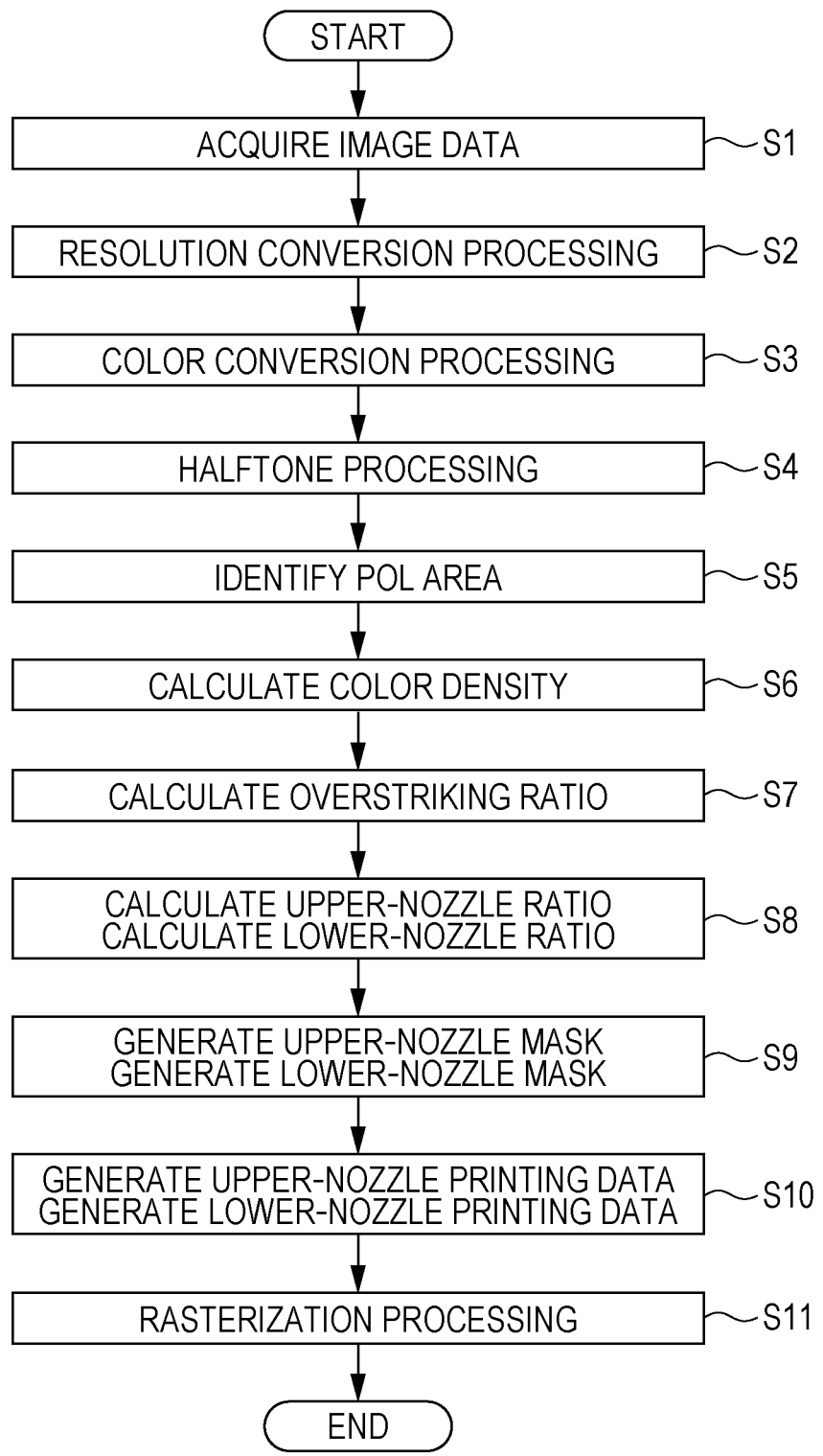
FIG. 4 is a flowchart illustrating an example of printing data generation processing performed by a terminal device, according to the first embodiment of the invention.

FIG. 4 is a flowchart illustrating an example of printing data generation processing performed by the terminal device 2. Description of this flowchart will be made referring to FIGS. 5A, 5B, and 5C (first diagrams that describe generation of printing data for a POL area) and FIG. 6 (a second diagram that describes generation of printing data for a POL area) when needed.

When the process flow shown in FIG. 4 is started, the image data acquisition section 210 acquires a set of printing target data from the storage section 250 (step S1). The set of printing target data is, for example, a set of RGB image data which includes, for each pixel, grayscale values each associated with a corresponding one of RGB colors.

Thereafter, the image processing section 220 performs resolution conversion processing (step S2). Specifically, the image processing section 220 converts a resolution of the set of printing target data having been acquired in step S1 into a printing resolution which is used in printing by the printer 3. The resolution conversion processing can be performed by using an existing technology, and thus, detailed description thereof is omitted here. In addition, this resolution conversion processing may be skipped. Further, the resolution conversion processing may not be performed prior to processing in step S3, but may be performed subsequent to processing in step S3 on a subset of image data for each color.

Thereafter, the image processing section 220 performs color conversion processing (step S3).

Specifically, the image processing section 220 converts the set of RGB image data resulting from the resolution conversion in step S2 into a set of image data which includes, for each pixel, grayscale values each associated with a corresponding one of one or more colors for use in printing (for example, CMYK colors, that is, cyan (C), magenta (M), yellow (Y), and black (K)). Since an existing technology can be used in this color conversion processing, detailed description thereof is omitted here.

Thereafter, the image processing section performs halftone processing (step S4). Specifically, the image processing section 220 performs dither processing on a set of image data resulting from the color conversion processing in step S3 by using a dither mask. In addition, in the case of a set of CMYK image data, the dither processing is performed by using dither masks each associated with a corresponding one of the CMYK colors. In this way, for each color, a subset of pieces of printing data each indicating whether a dot associated with a corresponding pixel is to be formed, or not (that is, "1" indicating ON state or "0" indicating OFF state)) is generated. This subset of pieces of printing data is also called a subset of dot data.

The following processes in steps S5 to S11 are performed for each of subsets of printing data which is associated with a corresponding one of the one or more colors (for example, CMYK colors). For the sake of easier understanding of the following description, description will be made while being focused on processing on one of the one or more colors.

First, the printing data generation section 230 identifies a POL area (step S5).

Specifically, the printing data generation section 230 extracts a block of dot data corresponding to a POL area from the subset of dot data having been generated in step S4. Further, the printing data generation section 230 extracts pieces of dot data which correspond to a surrounding area (adjacent area) of the POL area, and which are used for calculation of a color density of each of pixels included in edge portions of the block of dot data corresponding to the POL area.

Figure 5A:
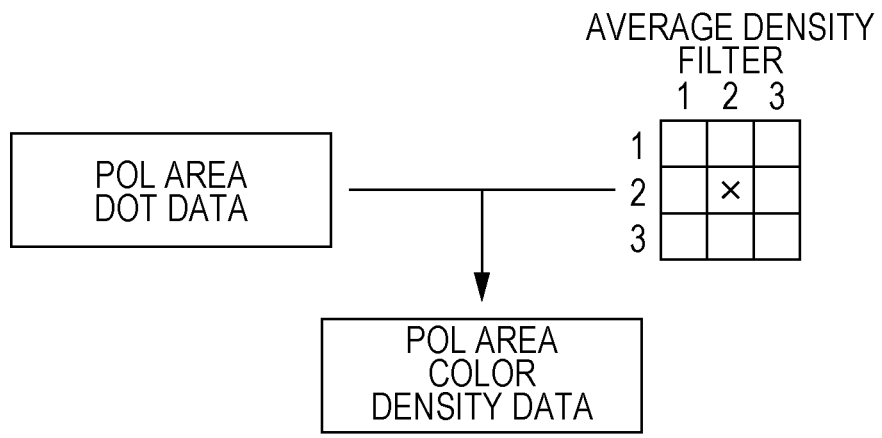
FIGS. 5A, 5B, and 5C are diagrams that describe generation of printing data for a POL area, according to the first embodiment of the invention.

Thereafter, the printing data generation section 230 calculates a color density of the POL area (step S6). Specifically, for example, as shown in FIG. 5A, the printing data generation section 230 generates pieces of color density data related to the POL area by applying an average density filter to the pieces of dot data having been extracted in step S5, that is, pieces of dot data included in the block of dot data corresponding to the POL area and the pieces of dot data (not illustrated) corresponding to the surrounding area of the POL area.

More specifically, the printing data generation section 230 applies, for each pixel (an attention pixel) of the POL area, a filter consisting of, for example, 3×3 pixel positions. In this case, nine pixels each associated with a corresponding one of the nine pixel positions of the filter correspond to a predetermined pixel unit described in appended claims. That is, the printing data generation section 230 associates a central pixel position of the filter (denoted by "X" in FIG. 5A) with the attention pixel of the POL area, and performs dividing the sum of numerical values (each being "1" (ON state) or "0" (OFF state)) of a corresponding one of target pixels of the POL area, each associated with a corresponding one of the nine pixel positions of the filter, by "9" which is the number of the target pixels. For example, in the case where there exist three pixels each having a numerical value "1" (ON state), a piece of color density data corresponding to the attention pixel results in 3/9=0.33 (numbers beyond the third decimal point are truncated), that is, 33%. In addition, in the case where the attention pixel exists in one of edge portions (inner portions each from a corresponding one of the upper, lower, left, and right edges) of the POL area, there occurs a case where at least one pixel each associated with a corresponding one of at least one partial pixel position of the filter does not exist within the POL area. In such a case, in the case where a portion of the subset of printing data exists outside the edge portion, the average density filter is applied by using, as the lacked at least one pixel, at least one pixel included in the portion of the subset of printing data; while, in the case where the subset of printing data does not exist outside the edge portion, the average density filter is applied by using, as the lacked at least one pixel, at least one pixel each resulting from copying one of pixels within the POL area (for example, one of pixels within the edge portion of the POL area). In this way, a piece of color density data is calculated for the attention pixel (i.e., the each pixel) of the POL area. In addition, this piece of color density data having been calculated here corresponds to an average color density described in appended claims. According to this embodiment, it is possible to reduce a variation width of a color density of each pixel by using such an average density filter as described above in the calculation of the color density of the each pixel.

Naturally, the average density filter is not limited to the above example. For example, the average density filter may be a filter of a larger size, such as a filter consisting of 5×5 pixel positions. In addition, since the degree of averaging of the color density of each pixel increases as the size of the average density filter is made larger, a smaller size is preferable. In this regard, however, the size of the average density filter may be increased as a resolution becomes higher. This increase of the size of the average density filter corresponds to an operation "increasing the number of pixels included in the predetermined pixel unit", which is described in appended claims. Further, a filter used for calculation of the color density is not limited to the average density filter, and may be a filter in which, for example, weighting is performed such that weighting factors are mutually different depending on their respective corresponding pixel positions. Further, the filter is not limited to such a square-shaped matrix consisting of, for example, 3×3 elements, and may be a rectangular-shaped matrix consisting of, for example, 1×7 elements.

Figure 5B:
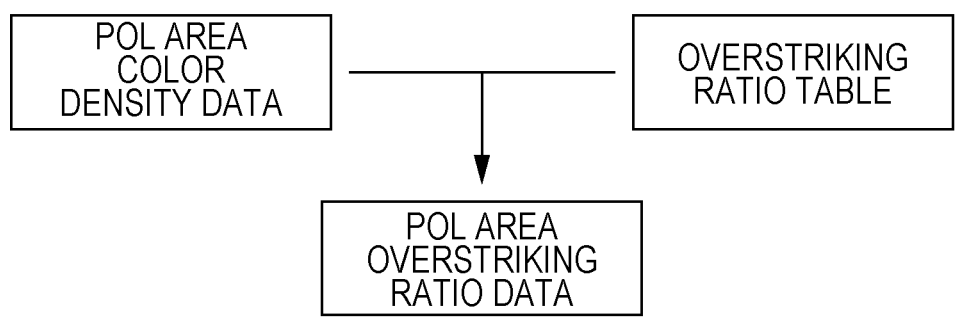

Thereafter, the printing data generation section 230 calculates an overstriking ratio for each pixel of the POL area (step S7). Specifically, for example, as shown in FIG. 5B, the printing data generation section 230 generates, for each pixel of the POL area, a piece of overstriking ratio data on the basis of the piece of color density data having been calculated in step S6 as well as an overstriking ratio table.

As described above, for each line of the POL area, printing operations are sequentially performed such that a printing operation through a corresponding one of the upper nozzles overlaps with another printing operation through a corresponding one of the lower nozzles. Thus, for each line of the POL area, a ratio of printing performed through a corresponding one of the upper nozzles and a ratio of printing performed through a corresponding one of the lower nozzles are set in advance. These ratios correspond to a ratio of an ink which is discharge through the corresponding upper nozzle to form a dot and a ratio of an ink which is discharge through the corresponding lower nozzle to form the same dot, and each of the ratios can be called an "ink ejection ratio". Initial setting values of these ratios are stored in the storage section 250 or the like by using a table, as shown in FIG. 7 (a diagram that illustrates an example of a nozzle ratio table), in which an upper-nozzle ratio and a lower-nozzle ratio are associated with each other for each of overlapping nozzle numbers 1 to 4 of upper nozzles and lower nozzles, through which printing on the POL area is performed. In the example shown in FIG. 7, upper-nozzle ratios 1, 2, 3, and 4 corresponding to the overlapping nozzle numbers 1, 2, 3, and 4 are 20%, 40%, 60%, and 80%, respectively, and lower-nozzle ratios 1, 2, 3, and 4 corresponding to the overlapping nozzle numbers 1, 2, 3, and 4 are 80%, 60%, 40%, and 20%, respectively. That is, the upper-nozzle ratios and the lower-nozzle ratios are set such that the sum of mutually associated upper-nozzle ratio and lower-nozzle ratio becomes 100%. In addition, ink ejection ratios each associated with a corresponding one of mutually associated upper nozzle and lower nozzle each have an initial value range smaller than 100%, and total a value of 100%. Further, the higher an ink ejection ratio is, an ink ejection amount (also referred to as an "ink discharge amount") is made larger.

Naturally, the values of the upper-nozzle ratios and the values of the lower-nozzle ratios are not limited to those of the example shown in FIG. 7.

Here, in this embodiment, overstriking ratios for use in correcting the initial values of the upper-nozzle ratios and the initial values of the lower-nozzle ratios in accordance with color densities are provided. The overstriking ratios are stored in the storage section 250 or the like by using a table, as shown in FIG. 8 (a diagram that illustrates an example of an overstriking ratio table), in which, for each of color density values, a value representing an overstriking ratio associated with the color density is listed. In the example shown in FIG. 8, which corresponds to a case where an average density filter consisting of 3×3 dots is used, each of color density values is represented by a ratio of a total number of dots each having a numerical value "1" indicating ON state (in this case, the total number being any one of "0" to "9") relative to the number of the dots constituting the average density filter (in this case, "9"). In addition, with respect to the above color density values, numbers beyond the third decimal point are truncated, and a resultant value is represented in percentage. The overstriking ratio increases as the color density increases. Further, each of the overstriking ratios is represented as a ratio (%) representing an incremental ratio relative to a reference upper-nozzle ratio and a reference lower-nozzle ratio.

Naturally, the overstriking ratios are not limited to those of the example shown in FIG. 8, provided that the overstriking ratio increases as the color density increases. For example, a relation formula obtained by approximating a relation between a group of color densities and a group of overstriking ratios by using a straight line or a curved line may be used. In this regard, however, when the reduction of the occurrences of both of the white streak and the black streak is intended, in the case where commonly used plain paper is a target printing medium, it is preferable that a maximum value of the overstriking ratio is made approximately 30% (refer to FIG. 8). In addition, the values of the overstriking ratios relative to those of color densities are determined in advance on the basis of results of experiments or the like.

The printing data generation section 230 extracts, for each pixel of the POL area, an overstriking ratio associated with the piece of color density data having been calculated in step S6 by referring to the overstriking ratio table. In this way, a piece of overstriking ratio data for each pixel of the POL is calculated. This method of causing the overstriking ratio to be increased along with the increase of the color density makes it possible to reduce the occurrences of the black streak to a greater degree in an area where the color density is low, and reduce the occurrences of the white streak to a greater degree in an area where the color density is high.

Figure 5C:
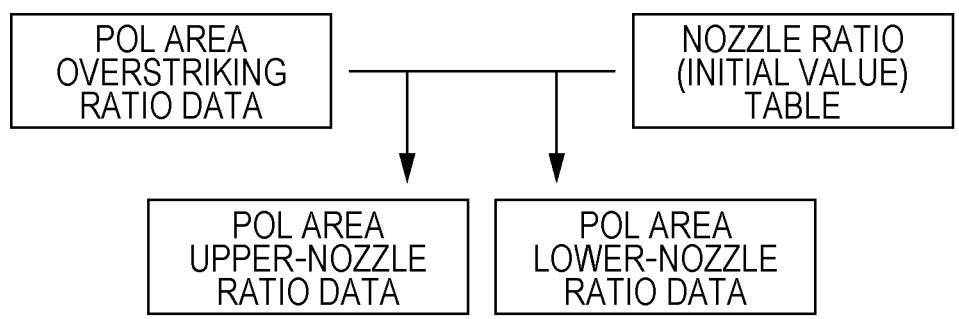

Thereafter, the printing data generation section 230 calculates an upper-nozzle ratio and a lower-nozzle ratio for each pixel of the POL (step S8). Specifically, for example, as shown in FIG. 5C, the printing data generation section 230 generates, for each pixel of the POL area, an upper-nozzle ratio and a lower-nozzle ratio on the basis of the overstriking ratio having been calculated in step S7 and the above-described nozzle ratio table in which the initial values of the nozzle ratios are set.

More specifically, the printing data generation section 230 calculates, for each pixel of the POL area, an upper-nozzle ratio and a lower-nozzle ratio, which are associated with the piece of overstriking ratio data having been calculated in step S7, by using the following formulas (1) and (2).

Upper-nozzle ratio=Upper-nozzle ratio initial value+
Overstriking ratio×Lower-nozzle ratio initial
value     (1);

Lower-nozzle ratio=Lower-nozzle ratio initial value+
Overstriking ratio×Upper-nozzle ratio initial
value     (2):

In the above formulas (1) and (2), with respect to each of "Lower-nozzle ratio initial value" in the formula (1) and "Upper-nozzle ratio initial value" in the formula (2), a decimal value resulting from conversion from a percent to a decimal is assigned thereto, and with respect to each of the other items, a percent value is assigned thereto as it is. In addition, the upper-nozzle ratio initial value and the lower-nozzle ratio initial value for each pixel of the POL area can be obtained by identifying an upper nozzle number and a lower nozzle number which are associated with printing operations on the each pixel, and extracting an upper-nozzle ratio and a lower-nozzle ratio which are associated with an overlapping nozzle number obtained from the identified upper nozzle number and lower nozzle number.

For example, in the case where an overlapping nozzle number corresponding to an upper nozzle and a lower nozzle which are associated with printing operations on a certain pixel is "1", an upper-nozzle ratio initial value for the pixel is 20%, and a lower-nozzle ratio initial value for the pixel is 80% (refer to FIG. 7). Further, in the case where an overstriking ratio for the pixel is 30% (refer to FIG. 8), an upper-nozzle ratio for the pixel results in 44% (according to the formula (1), 20+30×0.8=44), and a lower-nozzle ratio for the pixel results in 86% (according to the formula (2), 80+30×0.2=86). The sum of the upper-nozzle ratio and the lower-nozzle ratio becomes 130%. In this way, it is possible to calculate an upper-nozzle ratio and a lower-nozzle ratio for each pixel of the POL area. Further, it is possible to make a difference between the upper-nozzle ratio and the lower-nozzle ratio smaller by, not simply dividing an overstriking ratio equally, but preferentially allocating the overstriking ratio, that is, allocating a larger proportion of the overstriking ratio, to an upper-nozzle ratio initial value or a lower-nozzle ratio initial value, whichever is smaller. In addition, post-correction values each associated with a corresponding one of mutually associated upper-nozzle ink ejection rate and lower-nozzle ink ejection rate each have a range smaller than or equal to 100%, and total a value larger than or equal to 100%.

Figure 6A:
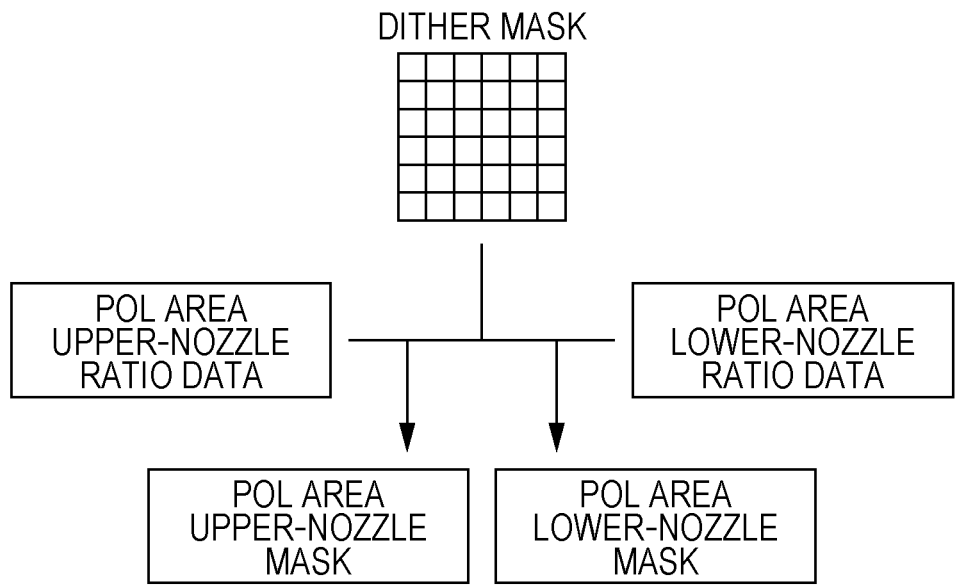
FIGS. 6A and 6B are diagrams that describe generation of printing data for a POL area, according to the first embodiment of the invention.

Thereafter, the printing generation section 230 generates an upper-nozzle mask and a lower-nozzle mask (step S9). Specifically, for example, as shown in FIG. 6A, the printing data generation section generates an upper-nozzle mask and a lower-nozzle mask for the POL area, on the basis of a predetermined dither mask and the pieces of upper-nozzle ratio data and the pieces of lower-nozzle ratio data for the POL area, these two kinds of pieces of nozzle ratio data having been calculated in step S8.

More specifically, the printing data generation section 230 acquires mask values (also called "threshold vales") each of which is applied to a corresponding one of pixels included in the POL area and which are used when repeatedly applying the predetermined dither mask, which is stored in the storage section 250 or the like, to a block of image data corresponding to the POL area in accordance with a predetermined rule. As the predetermined dither mask, differently from the case of step S4, a dither mask which is optimum in the allocation of dots to the upper nozzles and the lower nozzles in the POL area is used. But, the same dither mask as that having been used in step S4 may be used. The predetermined rule to be applied may be the same rule as that having been applied in step S4. The dither mask is, for example, a matrix consisting of 64×64 mask values, and each of the matrix values is a value resulting from converting a value falling within a range from "0" to "255" into a corresponding percentage falling within a range from "0%" to "100%".

Subsequently, the printing data generation section 230 compares, for each pixel of the POL area, a mask value associated with the pixel with an upper-nozzle ratio associated with the pixel. Further, in the case where the upper-nozzle ratio is larger than the mask value, the printing data generation section 230 sets an upper-nozzle mask logical value associated with the pixel into "1" indicating ON state. In contrast, in the case where the upper-nozzle ratio is smaller than or equal to the mask value, the printing data generation section 230 sets the upper-nozzle mask logical value associated with the pixel into "0" indicating OFF state.

Further, the printing data generation section 230 compares, for each pixel of the POL area, a mask value, which is associated with the pixel and which has been converted into a percentage falling within from "0%" to "100%", with a converted ratio resulting from subtracting a lower-nozzle ratio associated with the pixel from "100%" (i.e., Converted ratio=100%−Lower-nozzle ratio). Further, in the case where the converted ratio resulting from subtracting the lower-nozzle ratio from "100%" is smaller than or equal to the mask value, the printing data generation section 230 sets a lower-nozzle mask logical value associated with the pixel into "1" indicating ON state. In contrast, the converted ratio resulting from subtracting the lower-nozzle ratio from "100%" is larger than the mask value, the printing data generation section 230 sets the lower-nozzle mask logical value associated with the pixel into "0" indicating OFF state.

In the case where each of the upper-nozzle ratio initial value and the lower-nozzle ration initial value is not corrected by using the overstriking ratio, the total value of the upper-nozzle ratio initial value and the lower-nozzle ration initial value is 100%. In this case, when such comparison processing as described above is performed, a relation between a resultant upper-nozzle mask logical value and a resultant lower-nozzle mask logical value for each pixel of the POL area results in any one of relations (1:0), (0:1), and (0:0). In contrast, in this embodiment, since each of the upper-nozzle ratio initial value and the lower-nozzle ration initial value is corrected by using the overstriking ratio, there occurs a case where the total value of the upper-nozzle ratio initial value and the lower-nozzle ration initial value exceeds 100%. Thus, as a result, the relations between the resultant upper-nozzle mask logical value and the resultant lower-nozzle mask logical value for each pixel of the POL area further include a relation (1:1) in addition to the above three relations. Accordingly, such comparison processing as described above makes it possible to, for each pixel of the POL area, cause a state where each of a dot associated with an upper nozzle and a dot associated with a lower nozzle becomes "1" indicating ON state.

Thereafter, the printing data generation section 230 generates a block of upper-nozzle printing data and a block of lower-nozzle printing data (step S10).

Figure 6B:
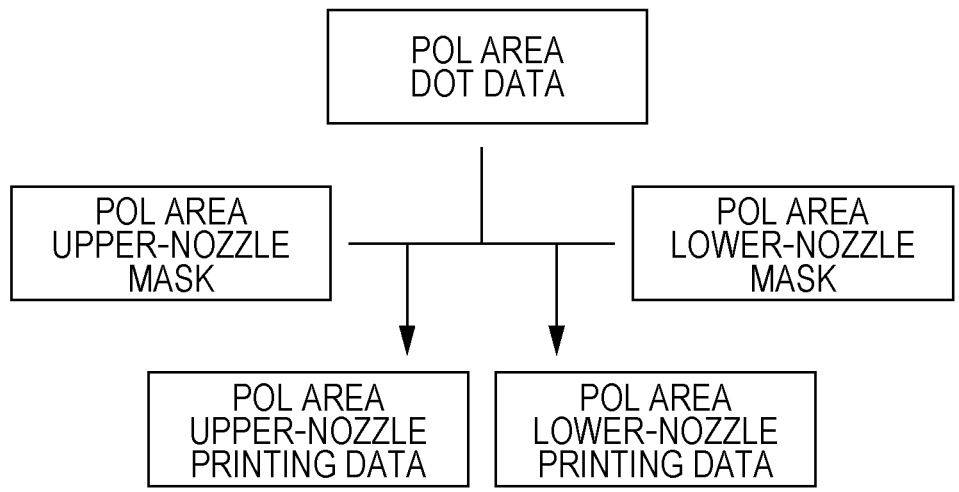

Specifically, for example, as shown in FIG. 6B, the printing data generation section 230 generates the block of upper-nozzle printing data and the block of lower-nozzle printing data for the POL area on the basis of the block of dot data for the POL area, which has been extracted in step S5, as well as the upper-nozzle mask and the lower-nozzle mask, which have been generated in step S9.

More specifically, the printing data generation section 230 generates the block of upper-nozzle printing data for the POL area by performing logical multiplication (AND operation) on each of pixel values included in the block of dot data for the POL area and a corresponding one of pixel values included in the upper-nozzle mask. Further, the printing data generation section 230 generates the block of lower-nozzle printing data for the POL area by performing logical multiplication (AND operation) on each of pixel values included in the block of dot data for the POL area and a corresponding one of pixel values included in the lower-nozzle mask.

Thereafter, the printing data output section 240 performs rasterization processing (step S11). Specifically, for an area other than the POL areas, the printing data output section 240 acquires part of the subset of dot data having been generated in step S4 as blocks of printing data which constitutes a target subset of printing data. Further, for each of the POL areas, the printing data output section 240 acquires the block of upper-nozzle printing data and the block of lower-nozzle printing data, which have been generated in step S10. Further, the printing data output section 240 rearranges pieces of printing data included in the above acquired blocks of data such that the pieces of printing data are arranged in order in which the printing head performs scanning, and sequentially transmits the rearranged pieces of printing data to the printer 3. In this way, the printer 3 performs POL printing by driving the printing engine on the basis of pieces of printing data having been sequentially received from the terminal device 2. The printing data output section 240 outputs all pieces of printing data corresponding to the set of printing target data, and then, terminates the process flow shown in FIG. 4.

The process units of the flowchart shown in FIG. 4 is just process units resulting from segmentation which is performed in accordance with main process contents in order to make it easy to understand the processing performed by the terminal device 2. The invention is not limited by any method of segmentation into process units as well as any name of a resultant process unit. The processing performed by the terminal device 2 can be further segmented into a larger number of process units in accordance with process contents. Further, the processing performed by the terminal device 2 can be segmented such that any one of resultant process units includes a larger number of processes. Further, the processing order of the processes of the above flowchart is not limited to that of the example shown in FIG. 4, as far as the advantage of some aspects of the invention can be achieved.

Hereinbefore, the first embodiment of the invention has been described. According to the first embodiment of the invention, in a serial printer, the reduction of the occurrences of both of the white streak and the black streak in the POL areas can be achieved, thereby enabling improvement of a printing quality.

Second Embodiment

Next, a second embodiment according to the invention will be described with reference to FIG. 9. The first embodiment is an embodiment of the serial printer, and the invention can be also applied to a line printer.

The line printer is a printer which performs printing on a line-by-line basis, and includes a printing head having at least a length equivalent to one line, in a line direction intersecting with a sub-scanning line. The line printer may be structured such that a plurality of printing heads each having a length shorter than that of one line are arranged in the line direction.

Figure 9:
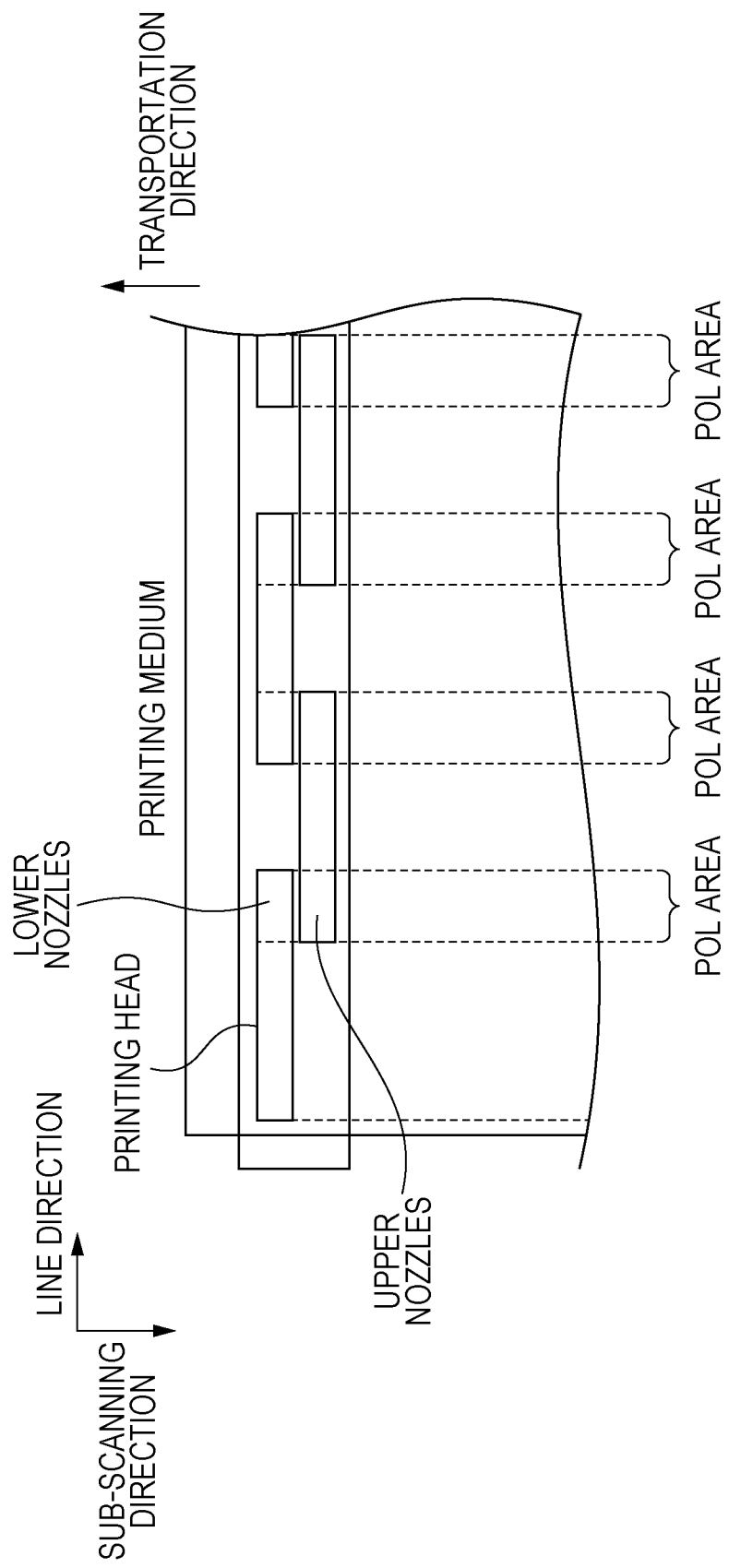
FIG. 9 is a diagram that describes an example of POL printing in a line printer according to a second embodiment of the invention.

For example, referring to FIG. 9 (a diagram that describes an example of POL printing in a line printer according to this second embodiment of the invention), individual printing heads are arranged such that every adjacent two of the printing heads are partially overlapped with each other when viewed from the sub-scanning direction. When the line printer performs printing on a line-by-line basis by using the printing heads which are arranged in such a manner, in a printing area corresponding to each line, there exist POL areas in each of which regions each printed by a corresponding one of two adjacent printing heads are partially overlapped with each other. In this case, with respect to two adjacent printing heads which perform printing on one of the POL areas, nozzles of one of the two adjacent printing heads can be handled as upper nozzles, and nozzles of the other one of the two adjacent printing heads can be handled as lower nozzles.

An image data acquisition section 210 and an image processing section 220 according to this second embodiment have the same functions as those of the first embodiment. A printing data generation section 230 according to this second embodiment generates, in each of the POL areas, shown in FIG. 9, in the case of a line printer, a block of printing data for the upper nozzles as well as a block of printing data for the lower nozzles. A printing data output section 240 according to this second embodiment rearranges pieces of printing data such that the pieces of printing data are arranged on a line-by-line basis, and sequentially transmits the rearranged pieces of printing data to a printer.

According to this second embodiment, in a line printer, the reduction of the occurrences of both of the white streak and the black streak in the POL areas can be achieved, thereby enabling improvement of a printing quality.

Third Embodiment

Next, a third embodiment according to the invention will be described with reference to FIG. 10. A line printer according to this third embodiment is different from the line printer according to the second embodiment in a configuration of printing heads.

The line printer according to this third embodiment is structured such that a plurality of printing heads each having a length shorter than a length equivalent to one line are arranged such that each of the printing heads is inclined at a predetermined angle to the line direction.

Figure 10:
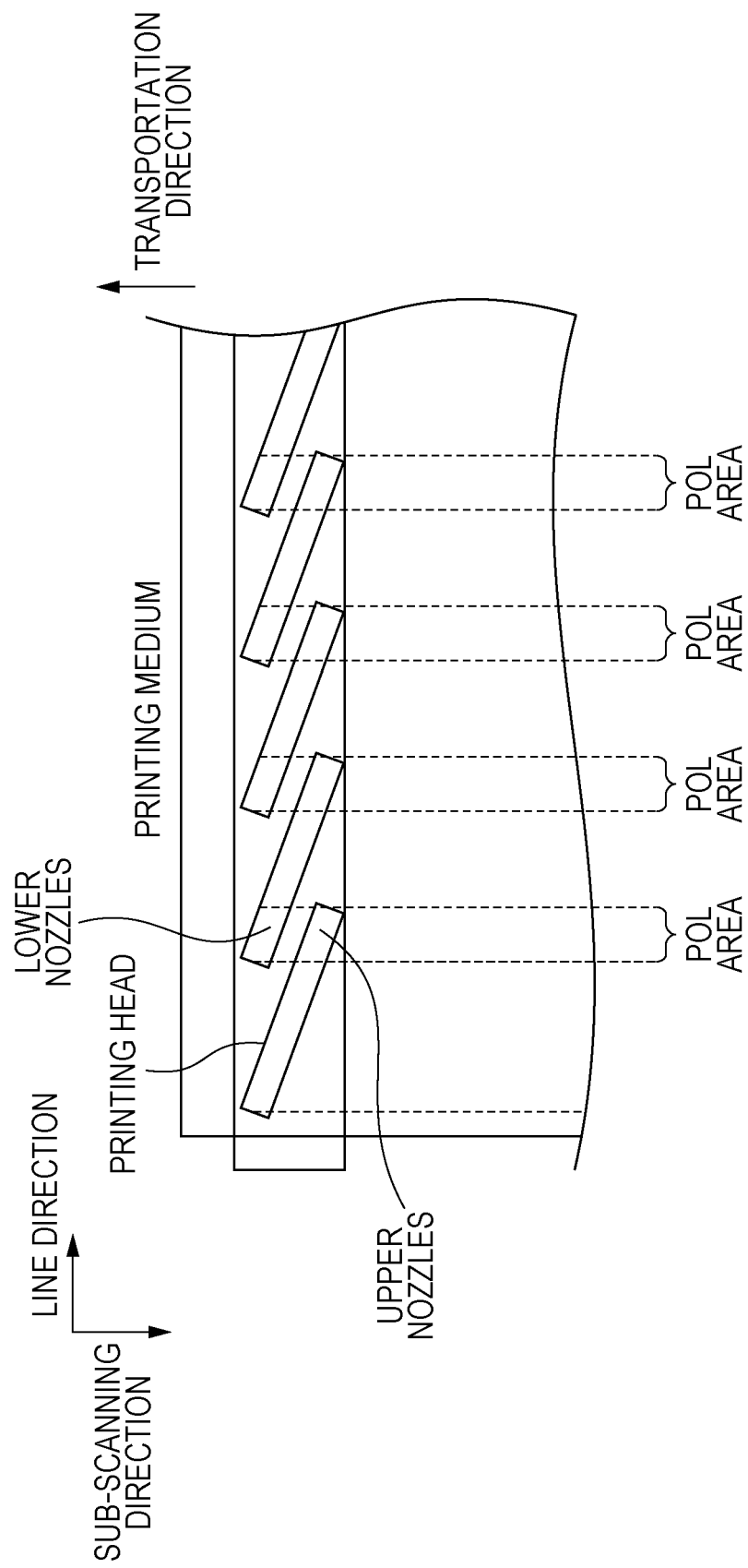
FIG. 10 is a diagram that describes an example of POL printing in a line printer according to a third embodiment of the invention.

For example, referring to FIG. 10 (a diagram that describes an example of POL printing in a line printer according to this third embodiment of the invention), individual printing heads are arranged such that each of the printing heads is inclined at a predetermined angle to the line direction and every adjacent two of the printing heads are partially overlapped with other when viewed from the sub-scanning direction. When the line printer performs printing on a line-by-line basis by using the printing heads which are arranged in such a manner, in a printing area corresponding to each line, there exist POL areas in each of which regions each printed by a corresponding one of two adjacent printing heads are partially overlapped with each other. In this case, with respect to two adjacent printing heads which perform printing on one of the POL areas, nozzles of one of the two adjacent printing heads can be handled as upper nozzles, and nozzles of the other one of the two adjacent printing heads can be handled as lower nozzles.

An image data acquisition section 210 and an image processing section 220 according to this third embodiment have the same functions as those of the first embodiment. A printing data generation section 230 according to this third embodiment generates a block of printing data for the upper nozzles as well as a block of printing data for the lower nozzles in each of the POL areas, shown in FIG. 9, in the case of the line printer. A printing data output section 240 according to this third embodiment rearranges pieces of printing data such that the pieces of printing data are arranged on a line-by-line basis, and sequentially transmits the rearranged pieces of printing data to a printer.

According to this third embodiment, in a line printer, the reduction of the occurrences of both of the white streak and the black streak in the POL areas can be achieved, thereby enabling improvement of a printing quality.

In addition, the aforementioned individual embodiments according to the invention are intended to exemplify the gist and the scope of the invention, and do not limit the gist and the scope of the invention.

First Modification Example

In each of the aforementioned embodiments, a piece of color density data is calculated for each pixel of a POL area by applying an average density filter (in step S6 of FIG. 4), and an overstriking ratio is calculated for the pixel (in step S7 of FIG. 4). In this regard, however, for each group consisting of a plurality of pixels, a piece of color density data and an overstriking ration which are common to each of pixels included in the group may be calculated.

Specifically, the printing data generation section 230 repeatedly applies an average density filter to a POL area such that a portion to which the average density filter is newly applied does not overlap any one of portions on each of which the average density filter has been previously applied. Further, the printing data generation section 230 calculates, for each position of the filter, a color density for pixels which are included in the POL area, and which are associated with the central pixel position of the filter being located at the position; calculates an overstriking ratio corresponding to the calculated color density; and handles the calculated overstriking ratio as an overstriking ratio corresponding to each of pixel positions included in the filter being located at the position.

Through this method, it possible to reduce an amount of arithmetic processing preformed for each pixel, and make a period of time required to perform processing for generating a set of printing data shorter. In particular, in the case where high resolution image data is handled, this method increases the above effect.

Second Modification Example

In each of the aforementioned embodiments, for each of colors (for example, each of CMYK colors) an overstriking ratio table common to the colors is used, but, for each of colors, a corresponding one of mutually different overstriking ratio tables may be used.

Figure 11:
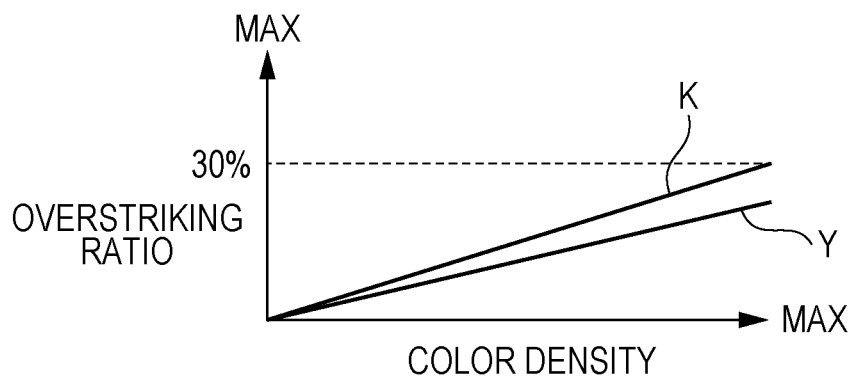
FIG. 11 is a diagram that describes a relation between a group of overstriking ratios and a group of color densities in a second modification example.

Specifically, for each of colors, a corresponding one of mutually different overstriking ratio tables is stored in the storage section 250 or the like. There is a difference in a relation between a group of color densities and a group of overstriking ratios between any two of the overstriking ratio tables each associated with a corresponding one of the colors. For example, a white streak which occurs when the landing of K is misaligned is more highly visible than a white streak which occurs when the landing of Y, which is lighter than K, is misaligned. Thus, the gradient of the increase of the overstriking ratio relative to the increase of the color density in an overstriking table for K is set so as to be larger than the gradient of the increase of the overstriking ratio relative to the increase of the color density in an overstriking table for Y. For example, a relation between a group of overstriking ratios for K and a group of overstriking ratios for Y can be represented as shown in FIG. 11 (a diagram that illustrates a relation between a group of overstriking ratios and a group of color densities in this second modification example). Naturally, in substitution for, or in addition to, making the gradient of the increase larger gradually, for each of color densities, an overstriking ratio regarding K may be made larger than an overstriking ratio regarding Y by a predetermined amount. In step S7 of FIG. 4, the printing generation section 230 generates, for each color of the POL area, pieces of overstriking ratio data on the basis of pieces of color density data for the each color, having been calculated in step S6, and an overstriking ratio table for the each color.

This method enables reduction of the occurrences of both of the white streak and the black streak in each of the POL areas with higher accuracy, thereby enabling improvement of a printing quality. In addition, such a relation as described above may be generated, not only between K and Y, but also between a dark color and a light color, such as K and C. Further, when the reduction of the occurrences of both of the white streak and the black streak is intended, in the case where commonly used plain paper is a target printing medium, it is preferable that a maximum value of an overstriking ratio regarding K is made approximately 30%, and a maximum value of an overstriking ratio regarding each of the other colors is made smaller than or equal to the maximum value of the overstriking ratio regarding K.

Third Modification Example

In each of the aforementioned embodiments, one overstriking ratio table is used regardless of a type of printing medium, but mutually different overstriking ratio tables each associated with a corresponding one of types of printing media may be used.

Figure 12:
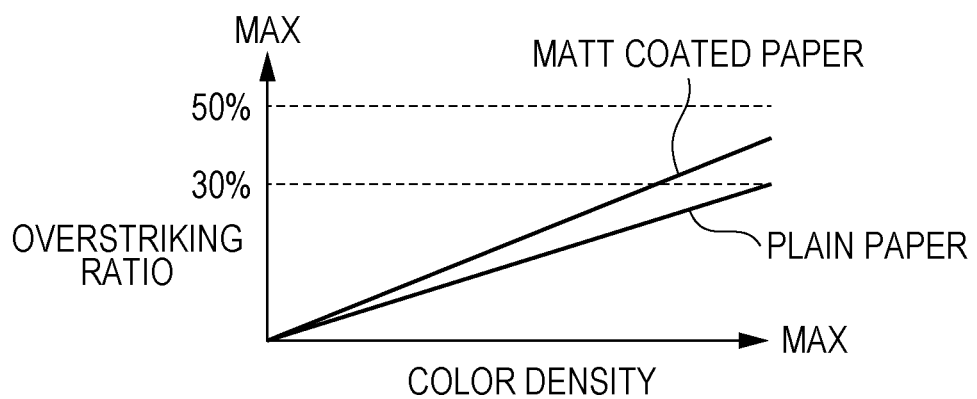
FIG. 12 is a diagram that describes a relation between a group of overstriking ratios and a group of color densities in a third modification example.

Specifically, for each type of printing medium, a corresponding one of mutually different overstriking ratio tables is stored in the storage section 250 or the like. There is a difference in a relation between a group of color densities and a group of overstriking ratios between any two of the mutually different overstriking ratio tables each associated with a corresponding one of the types of printing media. For example, the white streak is more likely to occur on printing paper, such as matte coated paper on which inks are relatively unlikely to run, than on printing paper, such as plain paper on which inks are relatively likely to run. Thus, the gradient of the increase of the overstriking ratio relative to the increase of the color density in an overstriking table for printing paper, such as matte coated paper, is set so as to be larger than the gradient of the increase of the overstriking ratio relative to the increase of the color density in an overstriking table for printing paper, such as plain paper. A relation between a group of overstriking ratios for matte coated paper or the like and a group of overstriking ratios for plain paper or the like can be represented as shown in, for example, FIG. 12 (a diagram that illustrates a relation between a group of overstriking ratios and group of color densities in this third modification example). Naturally, in substitution for, or in addition to, making the gradient of the increase larger gradually, for each of color densities, an overstriking ratio regarding printing paper, such as matte coated paper, may be made larger than an overstriking ratio regarding printing paper, such as plain paper, by a predetermined amount. In step S7 of FIG. 4, the printing generation section 230 generates, for each pixel of a POL area, a piece of overstriking ratio data on the basis of a piece of color density data having been calculated in step S6 as well as an overstriking ratio table corresponding to a detected type of printing medium.

The detection of the type of printing medium may be performed by using a sensor or the like or detecting a value having been input by a user or the like via the input device.

This method enables reduction of the occurrences of both of the white streak and the black streak in each of the POL areas with higher accuracy, thereby enabling improvement of a printing quality. In addition, when the reduction of the occurrences of both of the white streak and the black streak is intended, it is preferable that a maximum value of overstriking ratio values regarding printing paper, such as plain paper, is made approximately 30%, and a maximum value of overstriking ratio values regarding printing paper, such as matted coated paper, is made larger than the maximum value of the overstriking ratio regarding the printing paper, such as plain paper, and further is made maximally approximately 50%.

Other Modification Examples

The division of functions and processes between the terminal device 2 and the printer 3 is not limited to that of each of the aforementioned embodiments, as far as the functions and the processes of the printing system 1 can be realized as a whole. For example, in each of the aforementioned embodiments, the terminal device 2 generates a set of printing data and transmits it to the printer 3, but this processing may be made such that the terminal device 2 generates a set of printing target data (for example, RGB data); transmits it to the printer 3; and the printer 3 generates a set of printing data on the basis of the set of printing target data. In this case, printing data generation processing to be performed by the printer 3 is basically the same as that of the flowchart shown in FIG. 4. In such a printing system, the printer 3 can be also called a printing control apparatus.

The invention is not limited to a printing system using a printer, and can be also applied to, for example, a multi-function device having a printing function as well as a printing system using a coping machine. Further, the invention can be provided as, not only a printing system and a printing control system, but also a printing control method, a program, and the like.

Further, the invention is not limited to POL printing in band printing, and can be also applied to other printing methods, such as an interlaced printing method, in the same manner, provided that there exists any area on which overlapping printing operations are each sequentially performed through a corresponding one of a plurality of sets of nozzles. Further, the invention is not limited to printing in which there exist overlapping areas on each of which overlapping printing operations are each sequentially performed through a corresponding one of two scanning operations, and can be also applied to printing in which there exist overlapping areas on each of which overlapping printing operations are each sequentially performed through a corresponding one of three or more scanning operations.

What is claimed is:

1. A terminal device generating from an image data to a print data including an overlapping region by a plurality of nozzles in a printing region in which a plurality of raster lines are printed, the terminal device comprising:
   an image data acquiring section acquiring the image data;
   an image processing section generating a dot data indicating whether or not a corresponding dot is to be formed on the basis the image data; and
   a printing data generating section generating the print data based on the dot data, the printing data generating section including:
      an overstriking ratio calculating section calculating an overstriking ratio including a ratio representing an incremental ratio relative to a reference upper end nozzle group ratio and a reference lower end nozzle group ratio based on a density data of the overlapping region and a first data; and
      a nozzle ratio calculating section calculating an upper end nozzle group ratio and a lower end nozzle group ratio corresponding to the printing of the overlapping region based on an overstriking ratio data and a second data;
   wherein the first data is a data that is associated with the overstriking ratio for each of density value; and the second data is a data that is associated with the upper end nozzle group ratio and the lower end nozzle group ratio for each of overlapping nozzle,
   wherein the printing data generation section calculates an average color density of the overlapping area in the image data for each predetermined pixel unit and performs correction in accordance with the calculated average color density for each predetermined pixel unit, and
   wherein a maximum value of an overstriking ratio regarding black is made 30%, and a maximum value of an overstriking ratio regarding each of the other colors is made smaller than or equal to the maximum value of the overstriking ratio regarding black.

2. The terminal device according to claim 1, wherein the printing data generation section performs correction in which an amount of an ink to be discharged is increased when a color density of the overlapping area in the image data is increased.

3. The terminal device according to claim 2, wherein the printing data generation section performs correction in which an amount of an ink that is to be ejected in a scanning operation that has used smaller amount of ink than the other scanning operations, is increased.

4. The terminal device according to claim 1, wherein the printing data generation section increases the number of pixels in the predetermined pixel unit when a resolution of the image data is higher.

5. The terminal device according to claim 1, wherein the printing data generation section performs correction in accordance with a color density of an area surrounding the overlapping area in the image data.

6. The terminal device according to claim 1, wherein a gradient of an increase of the overstriking ratio relative to an increase of a color density in an overstriking data for black is set so as to be larger than a gradient of the increase of the overstriking ratio relative to an increase of a color density in an overstriking data for yellow.

7. An image forming method for generating from an image data to a print data including an overlapping region by a plurality of nozzles in a printing region in which a plurality of raster lines are printed, the image forming method comprising:
    an image data acquiring step acquiring the image data;
    an image processing step generating a dot data indicating whether or not a corresponding dot is to be formed on the basis the image data; and
    a printing data generating step generating the print based on the dot data, the printing data generating step including:
        an overstriking ratio calculating process calculating an overstriking ratio including a ratio representing an incremental ratio relative to a reference upper end nozzle group ratio and a reference lower end nozzle group ratio based on a density data of the overlapping region and a first data; and
        a nozzle ratio calculating process calculating an upper end nozzle group ratio and a lower end nozzle group ratio corresponding to the printing of the overlapping region based on an overstriking ratio data and a second data;
    wherein the first data is a data that is associated with the overstriking ratio for each of density value; and the second data is a data that is associated with the upper end nozzle group ratio and the lower end nozzle group ratio for each of overlapping nozzle,
    wherein the printing data generation section calculates an average color density of the overlapping area in the image data for each predetermined pixel unit and performs correction in accordance with the calculated average color density for each predetermined pixel unit, and
    wherein a maximum value of an overstriking ratio regarding black is made 30%, and a maximum value of an overstriking ratio regarding each of the other colors is made smaller than or equal to the maximum value of the overstriking ratio regarding black.

8. A printer for inputting a print data from an image forming apparatus which is generated from image data including an overlapping region by a plurality of nozzles in a printing region in which a plurality of raster lines are printed, the printer comprising:
    an image data acquiring section acquiring the image data;
    an image processing section generating a dot data indicating whether or not a corresponding dot is to be formed on the basis the image data; and
    a printing data generating section generating the print data based on the dot data, the printing data generating section including:
        an overstriking ratio calculating section calculating an overstriking ratio including a ratio representing an incremental ratio relative to a reference upper end nozzle group ratio and a reference lower end nozzle group ratio based on a density data of the overlapping region and a first data; and
        a nozzle ratio calculating section calculating an upper end nozzle group ratio and a lower end nozzle group ratio corresponding to the printing of the overlapping region based on an overstriking ratio data and a second data;
    wherein the first data is a data that is associated with the overstriking ratio for each of density value; and the second data is a data that is associated with the upper end nozzle group ratio and the lower end nozzle group ratio for each of overlapping nozzle,
    wherein the printing data generation section calculates an average color density of the overlapping area in the image data for each predetermined pixel unit and performs correction in accordance with the calculated average color density for each predetermined pixel unit, and
    wherein a maximum value of an overstriking ratio regarding black is made 30%, and a maximum value of an overstriking ratio regarding each of the other colors is made smaller than or equal to the maximum value of the overstriking ratio regarding black.

9. The printer according to claim 8, wherein the first data and the second data are stored as a table.

10. The printer according to claim 8, wherein the first data and the second data are stored as a mathematical formula.

11. The printer according to claim 8, wherein the image processing section generates a dot data indicating whether or not a corresponding dot is to be formed for ink each of a plurality of colors, and the printing data generating section generates the print data by a common overstriking ratio with respect to the ink each of a plurality of colors.

12. The printer according to claim 8, wherein the image processing section generates a dot data indicating whether or not a corresponding dot is to be formed for each ink of a plurality of colors, and the printing data generating section generates the print data by a different overstriking ratios with respect to the ink each of a plurality of colors.

13. The printer according to claim 8, wherein the printing data generating section generates the print data using different overstrike ratios data for each type of medium.

* * * * *